United States Patent

Turczyn et al.

[11] Patent Number: 5,086,890
[45] Date of Patent: Feb. 11, 1992

[54] ENGINE BRAKING SYSTEM

[75] Inventors: James F. Turczyn, Waukesha; Gary J. Gracyalny, Brown Deer, both of Wis.; David W. Baylor, New Albany, Ind.

[73] Assignee: Briggs & Stratton Corporation, Wauwatosa, Wis.

[21] Appl. No.: 631,630

[22] Filed: Dec. 21, 1990

Related U.S. Application Data

[63] Continuation-in-part of Ser. No. 493,338, Mar. 14, 1990, Pat. No. 5,040,644.

[51] Int. Cl.$^5$ .................. B60K 41/20; F16D 49/00
[52] U.S. Cl. .................... 192/1.44; 56/11.3; 74/98; 188/166
[58] Field of Search .................. 192/1.36, 1.4, 1.44, 192/1.37, 1.38, 1.43, 1.45, 1.46, 1.47, 1.48, 1.49, 1.5; 56/11.3; 74/98, 480 R; 188/166, 74, 105

[56] References Cited

U.S. PATENT DOCUMENTS

| 304,545 | 9/1884 | Newell | 74/98 X |
|---|---|---|---|
| 2,985,268 | 5/1961 | Morse | 74/480 R X |
| 3,382,960 | 5/1968 | Willey | |
| 4,035,021 | 7/1977 | Krug | 74/98 X |
| 4,232,768 | 11/1980 | Dufresne | |
| 4,394,893 | 5/1985 | Kronich | 192/1.44 |
| 4,419,857 | 12/1983 | Smith | 56/11.3 |
| 4,519,486 | 5/1985 | Hermanson | 192/1.44 |
| 4,757,885 | 7/1988 | Kronich | 192/1.4 |
| 4,889,213 | 12/1989 | Roller | 192/1.44 |
| 5,040,644 | 8/1991 | Turczyn et al. | 188/166 |

FOREIGN PATENT DOCUMENTS 0019233 11/1980 European Pat. Off. .

Primary Examiner—Rodney H. Bonck
Attorney, Agent, or Firm—Andrus, Sceales, Starke & Sawall

[57] ABSTRACT

A brake mechanism wherein a bracket is attached to a small engine. The bracket comprises two rotating arms, a spring, a brake pad and cable attachments. When an operator of a small engine releases a cable attached to the brake assembly, the spring rotates an arm which further engages a brake pad for slowing the engine and stopping it. The cable may be attached to either arm for releasing and engaging the brake pad, which allows the small engine to be mounted on an apparatus in more than one orientation.

4 Claims, 3 Drawing Sheets

ENGINE BRAKING SYSTEM

BACKGROUND OF THE INVENTION

This is a continuation-in-part of pending U.S. patent application Ser. No. 493,338 filed Mar. 14, 1990 and now U.S. Pat. No. 5,040,644.

This invention relates to internal combustion engines and more particularly to the braking mechanism employed in such engines.

Under regulations promulgated by the Consumer Product Safety Commission, a lawn mower, one use of such engines, must be equipped with a "deadman" device that will stop the lawn mower blade within three seconds after the operator has released his grip on the lawn mower handle. The device is usually a bar connected to the handle that is squeezed by the lawn mower operator which in turn pulls a cable connected to a brake releasing the brake from its lawn mower brake position.

When the brake is engaged (the brake being seated on the flywheel) the engine cannot operate. As the brake is released, the engine can be started and operated.

The purpose of the brake mechanism in a lawn mower application is to protect unwary people from injury when the operator of the lawn mower is not actually operating the lawn mower.

A drawback of the current art is that a cable can only be attached to the brake mechanism in one position. This limits the orientation in which an engine may be mounted on a lawn mower or other equipment requiring a "deadman" feature and causes great expense to the engine manufacturer to tailor an engine specifically for a customer.

SUMMARY OF THE INVENTION

The present invention is a brake mechanism that may be attached to a small engine, typically used in a lawn mower application. The brake mechanism is operated by a cable which is a part of the "deadman" device.

The novelty of the brake mechanism is that a cable can be attached to it from, at least, opposite directions. The invention allows the manufactured engine to be mounted on a lawn mower or other equipment in more than one orientation without losing the ability to effectively attach the "deadman" cable.

A feature and an advantage of the present invention is the ability of the engine manufacturer to sell his engine to various customers without having to make individual alterations adjusting for the orientation a customer mounts the engine on his equipment. Specifically, an engine may be mounted on a lawn mower in one orientation by a customer and mounted in a completely opposite orientation by another customer, thereby changing the cable mounting position.

It is a further feature and advantage of the present invention to allow a customer purchasing the engine to mount it on a lawn mower or other equipment in any orientation without having the "deadman" cable located in positions that may cause problems regarding the safe and cost efficient operation of the lawn mower or equipment.

These and other features and advantages of the present invention will be apparent to those skilled in the art from the detailed description of the preferred embodiment and the drawing.

BRIEF DESCRIPTION OF THE DRAWINGS

The drawings illustrate the best mode presently contemplated for carrying out the invention. In the drawings.

DETAILED DESCRIPTION OF THE INVENTION

Figure 1:
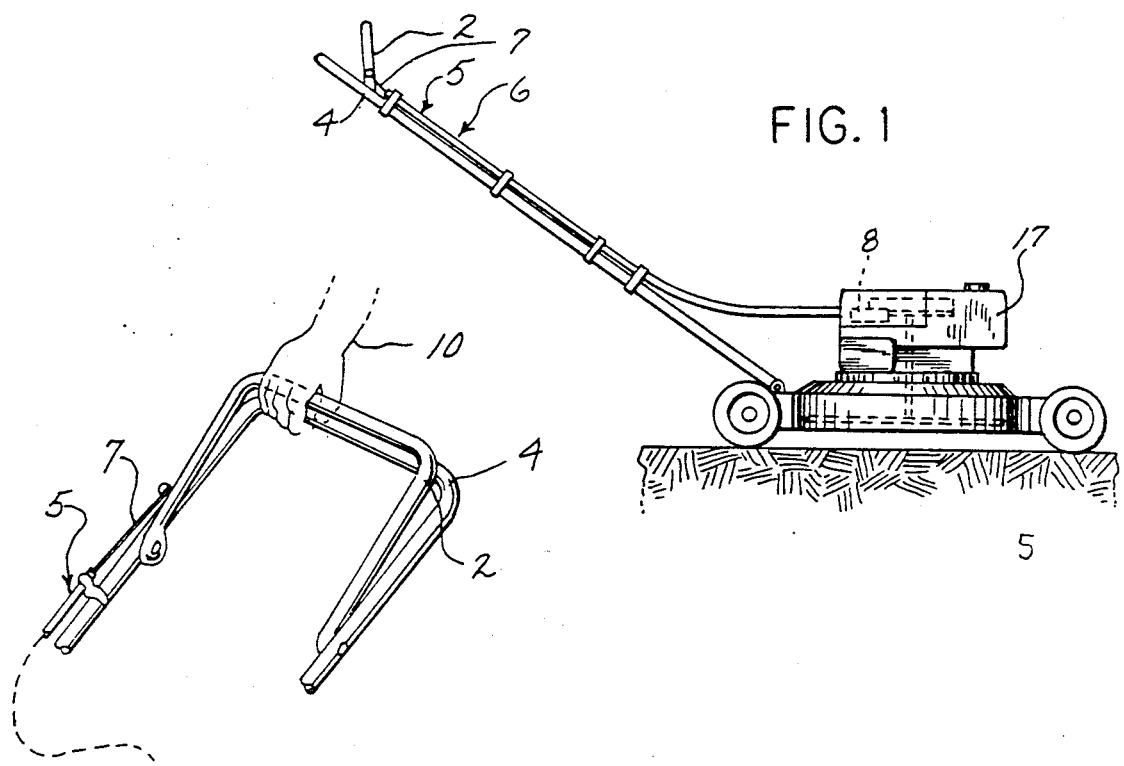
FIG. 1 is a side view of a lawn mower with a "deadman" handle.

As seen in FIG. 1 a "deadman" bar 2 is attached to a lawn mower handle 4. A cable 6 consisting of casing 5 and wire 7 is connected to deadman bar 2 on one end and connected to brake mechanism 8 on the other end.

Figure 2:
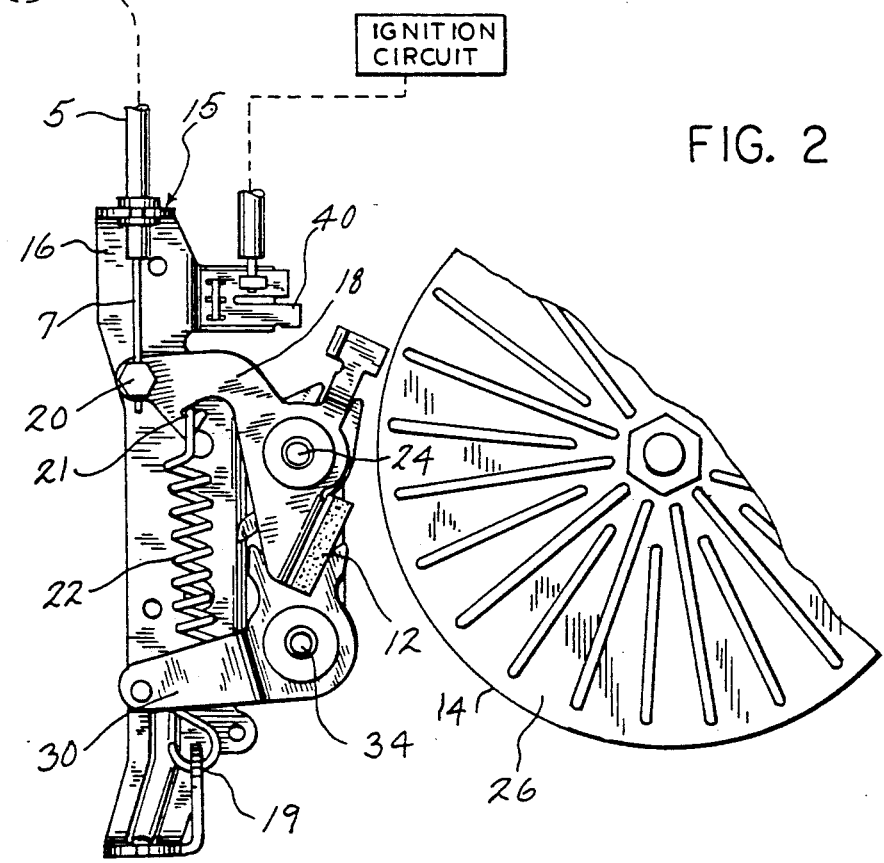
FIG. 2 is a top view of a first embodiment of the invention, showing the brake pad disengaged from a flywheel and the cable connection to the "deadman" handle located on a lawn mower.

When the lawn mower operator 10 in FIG. 2 squeezes the "deadman" bar 2 together with handle 4, cable 6 is pulled so that brake pad 12 disengages brake surface 14.

Figure 3:
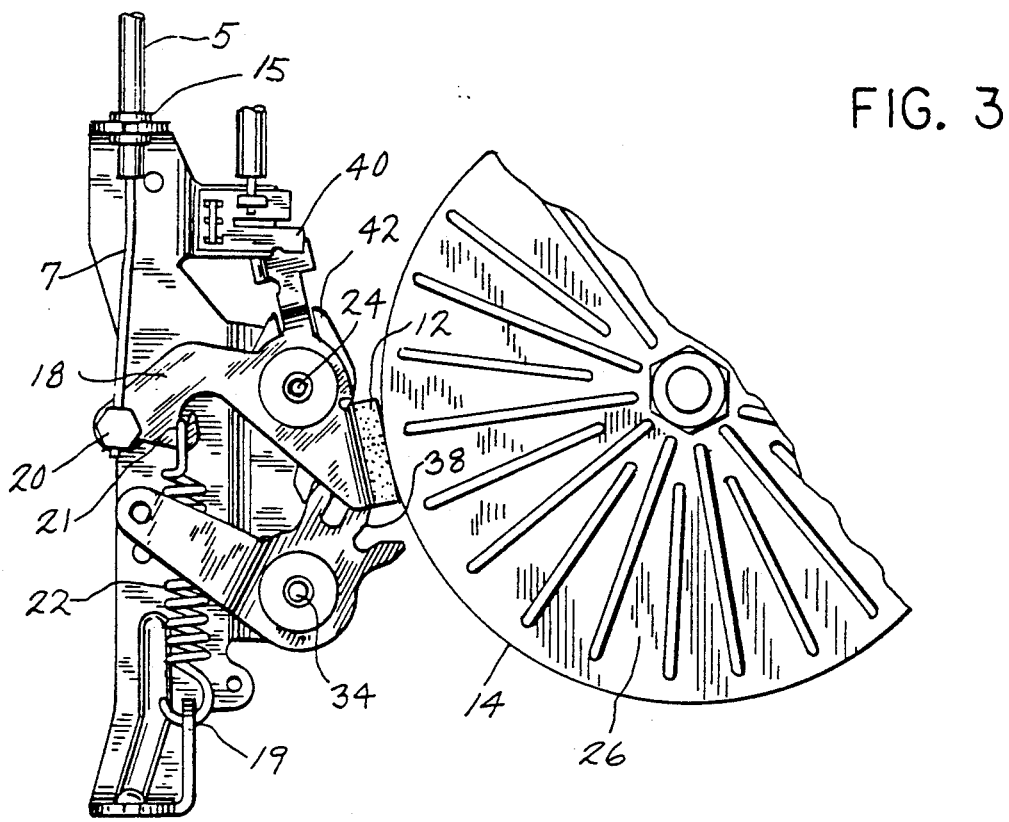
FIG. 3 is a top view of the first embodiment showing the brake pad engaged with a flywheel.

FIGS. 2 and 3 depict a first embodiment of the invention in which one end of spring 22 is attached to bracket 16 and the other end attached to a pivoting arm. In FIGS. 2 and 3, cable casing 5 is attached to handle 4 at one end and to bracket 16 (FIG. 2) at point 15 at the other end. Brake mechanism 8 is attached to engine 17 (FIG. 1). Cable 6 is attached to arm 18 at point 20. As lawn mower operator 10 squeezes bar 2 together with handle 4, cable 6 pulls at point 20 which in turn rotates arm 18 in a clockwise direction around pivot point 24. This rotation disengages brake pad 12, attached to arm 18, from brake surface 14 allowing rotating member 26 to turn and engine 17 (FIG. 1) to operate.

When lawn mower operator 10 releases his grip on bar 2 and handle 4, spring 22 having one end attached to point 19 and a second end attached to point 21, rotates arm 18 at point 21 in a counter-clockwise direction around pivot point 24 until brake pad 12 reengages brake surface 14 (FIG. 3) slowing rotating member 26 and thereby slowing engine 17 (FIG. 1).

Figure 4:
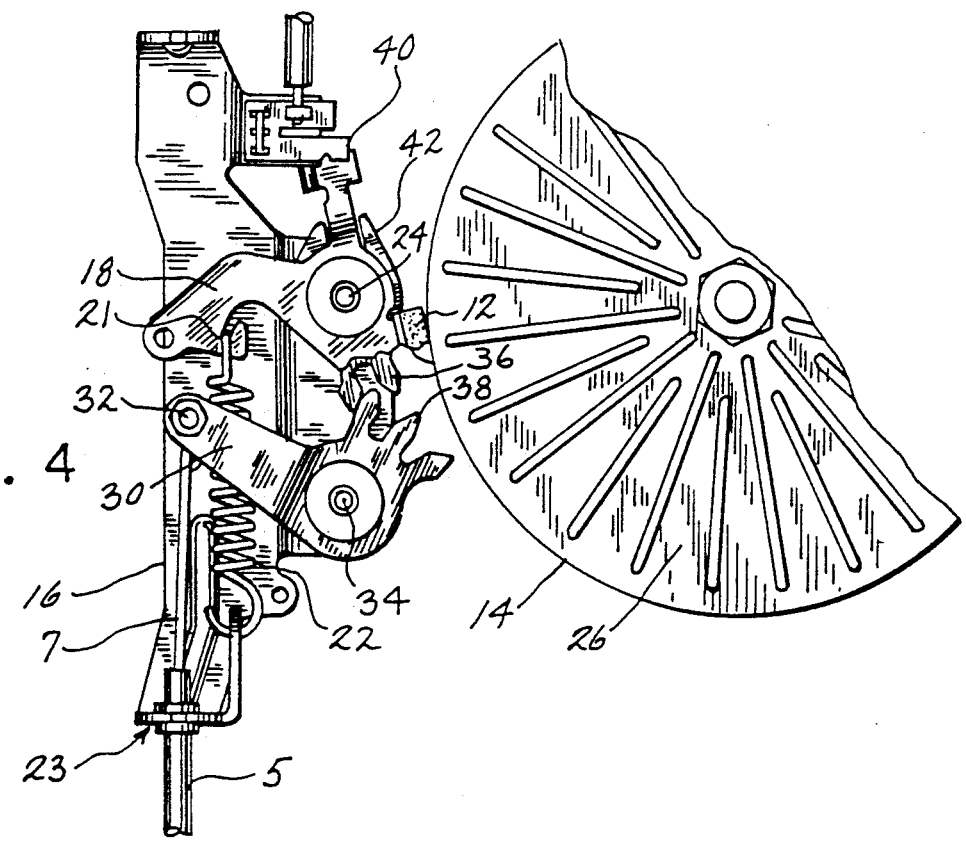
FIG. 4 is a partial cutaway top view of a second embodiment showing the cable attached to the brake mechanism from another direction.

FIG. 4 depicts a second embodiment of applicants' invention. As shown in FIG. 4, brake mechanism 8 in FIG. 1 may also be engaged by cable 6 (FIG. 4) being attached to arm 30 from another direction. Cable casing 5 (FIG. 1) is attached to handle 4 at on end and to bracket 16 (FIG. 4) at point 23 at the other end. When lawn mower operator 10 in FIG. 2 squeezes bar 2 together with handle 4, cable 6 (FIG. 4) pulls at point 32 on arm 30 which in turn rotates arm 30 in a counter-clockwise direction around pivot point 34. That rotation of arm 30 also rotates meshing teeth 38, attached to arm 30, in a counter-clockwise direction. First engagement means, meshing teeth 38 which are engaging second engagement means, meshing teeth 36, attached to arm 18, rotate meshing teeth 36 in a clockwise direction which in turn rotates arm 18 in a clockwise direction disengaging brake pad 12, attached to arm 18, from brake surface 14 allowing rotating member 26 (such as a flywheel, crankshaft, cam shaft, etc.) to turn and engine 17 (FIG. 1) to operate. Brake pad 12 is contoured from repeated touching on brake surface 14.

In the preferred embodiment, meshing teeth 36 (FIG. 4) are attached to rack 42 which is interconnected with arm 18 and rotates with arm 18.

When lawn mower operator 10 (FIG. 2) releases his grip on bar 2 and handle 4, spring 22 (FIG. 4) at point 21 rotates arm 18 in a counter-clockwise direction around pivot point 24 which also rotates brake pad 12, attached to arm 18, in a counter-clockwise direction. Meshing teeth 36 engage meshing teeth 38, attached to arm 30 and rotate meshing teeth 38 and arm 30 in a clockwise direction pulling tensionless cable 6 until brake pad 12 engages brake surface 14.

Bracket 16 may have either or both an ignition ground switch 40 and an electric start circuit switch (not shown). Both switches may be actuated by rotation of arm 18 or arm 30 as brake pad 12 touches brake surface 14. An actuated ignition ground switch 40 prevents engine ignition and an actuated electric start circuit switch prevents operation of an electric starter.

In an alternate embodiment, casing 5 (FIGS. 1-5) may be moved to actuate the brake mechanism rather than wire 7.

Figure 5:
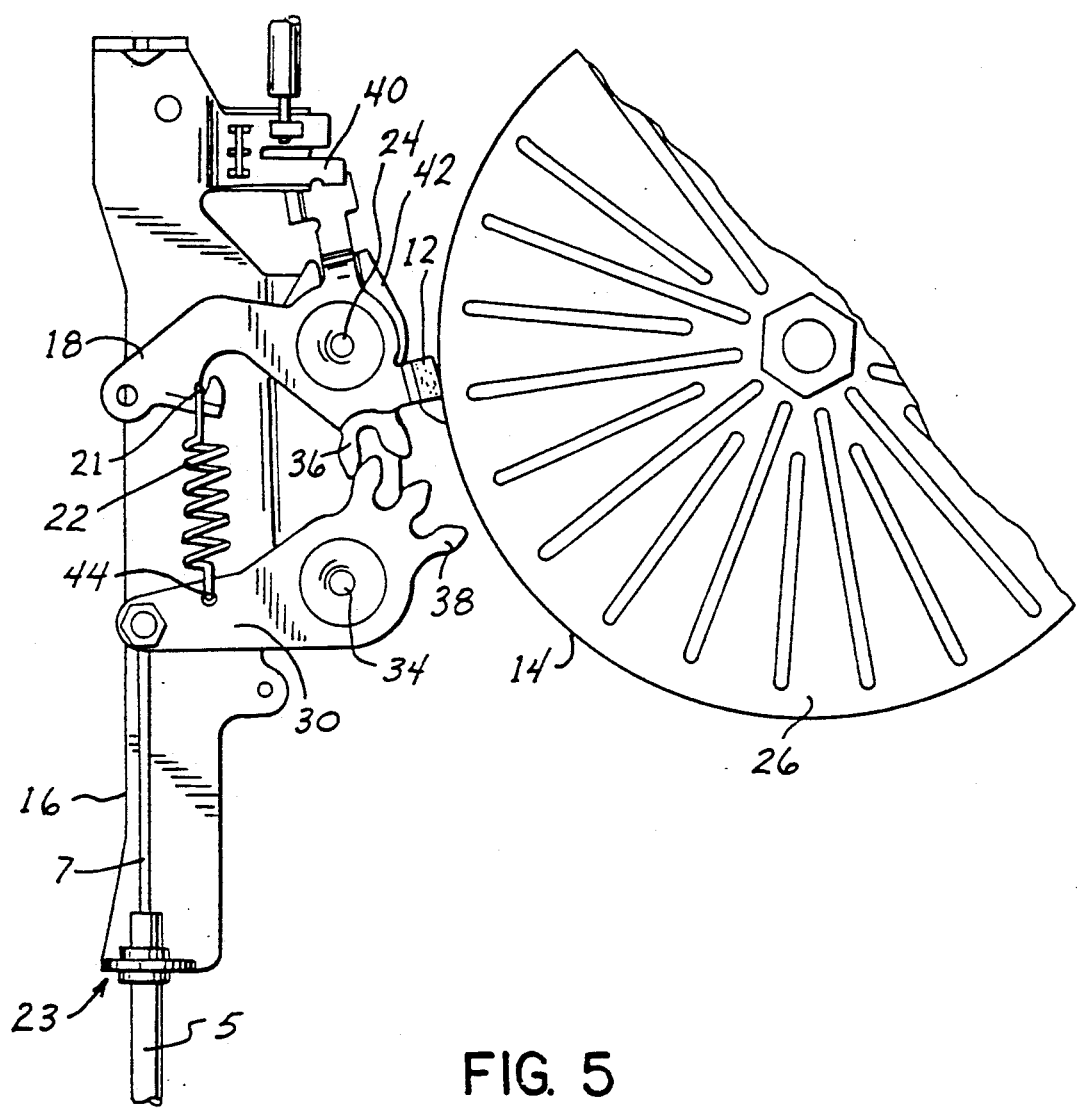
FIG. 5 is a partial cutaway top view of a third embodiment of the present invention.

FIG. 5 depicts a third embodiment of the applicants' invention. In FIG. 5 as in all the figures, components having corresponding functions have been given the same numerical designations.

The primary difference between the third embodiment of FIG. 5, and the second embodiment depicted in FIG. 4 is the manner in which spring 22 is connected. In FIG. 5, one end of spring 22 is attached to arm 18 at point 21 as in the first and second embodiments discussed above. However, the other end of spring 22 is attached to arm 30 in the third embodiment (FIG. 5) instead of being attached to bracket 16 at point 19 as in the first and second embodiments (FIGS. 2-4).

The third embodiment depicted in FIG. 5 operates in substantially the same manner as the second embodiment, the operation of which is discussed above with reference to FIG. 4.

The invention's use with a lawn mower is only one application. Various modes of carrying out the invention are contemplated as being within the scope of the following claims, particularly pointing out and distinctly claiming the subject matter which is regarded as the invention.

What is claimed is:

1. Apparatus for slowing a rotating member of an internal combustion engine, the apparatus having at least one cable and a brake surface, comprising:
   a bracket attached to the engine;
   a first arm in pivotal engagment with said bracket at a first pivot point and attached to said at least one cable;
   a second arm in pivotal engagement with said bracket at a second pivot point;
   a brake pad attached to either said first arm or said second arm that engages said brake surface;
   a spring having a first end and a second end, said first end being attached to said first arm and said second end being attached to said second arm; and
   a first engagement means interconnected with said first arm and a second engagement means interconnected with said second arm, said first and second engagement means for engaging each other in response to movement by said cable.

2. The apparatus of claim 1, wherein said brake pad comprises a surface that engages said brake surface.

3. The apparatus of claim 1, wherein the internal combustion engine also has an ignition ground switch that is attached to said bracket, and wherein said first or said second arm actuates said ignition ground switch.

4. The apparatus of claim 1, wherein said first or second engagement means comprises a rack having teeth for meshing engagement.

* * * * *